Aug. 24, 1943.                C. D. KELLY                2,327,802
                        SHIELD FOR REAR VIEW MIRRORS
                           Filed Aug. 15, 1941

INVENTOR.
C. D. KELLY
BY
ATTORNEY.

Patented Aug. 24, 1943

2,327,802

UNITED STATES PATENT OFFICE 2,327,802

SHIELD FOR REARVIEW MIRRORS

Carl D. Kelly, Portland, Oreg.

Application August 15, 1941, Serial No. 407,026

3 Claims. (Cl. 88—77)

This invention relates generally to the automotive industry and particularly to a shield for rear view mirrors.

The main object of this invention is to provide an exceedingly simple and efficient form of shield for rear view mirrors which can be attached thereto by pressure and which will effectively prevent any glare from the rear view mirror striking the eyes of the driver.

The second object is to construct a shield of the class described of a material and in a form which will prevent glare and at the same time enable the driver to learn of the rear approach of an automobile.

These and other objects are accomplished in the manner set forth in the following specification as illustrated in the accompanying drawing, in which.

Similar numerals refer to similar parts throughout the several views.

Figures 3, 4:
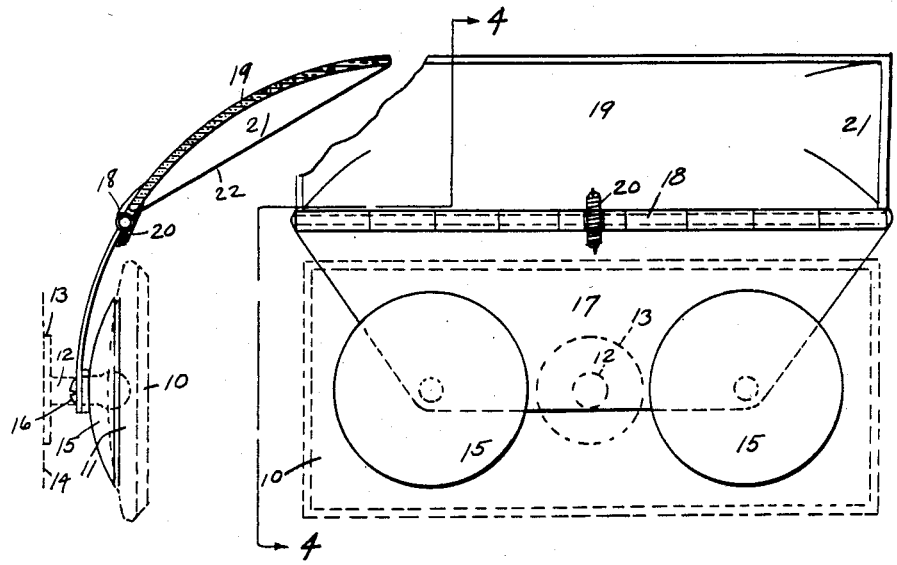
Fig. 3 is a front elevation of the device showing it in an open position.
Fig. 4 is a fragmentary section taken along the line 4—4 in Fig. 3.

Referring in detail to the drawing, there is shown in dotted lines a common form of rear view mirror 10 whose convex back 11 is mounted on a standard 12 projecting from the base 13 which is secured to the windshield frame 14.

Referring particularly to my invention, same will be seen to consist of a pair of resilient vacuum cups 15 which are secured by means of the screws 16 to the metallic back 17 to whose edge 18 is hinged the translucent concave front 19 which is urged toward the back 17 by means of a spring 20 somewhat after the fashion of an ordinary spectacle case.

It will be noted that the ends 21 of the front 19 are curved longitudinally in a manner to place the edge 22 in a single straight plane and that the concavity of the front 19 is sufficient to receive the reflecting portion of the mirror 10.

Figures 1, 2:
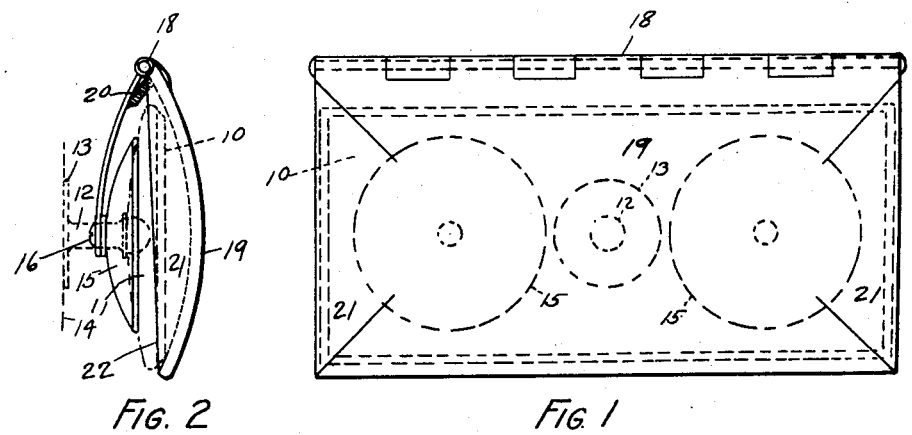
Fig. 1 is a front elevation of a device showing it in a closed position.
Fig. 2 is a side elevation of Fig. 1.

It can be seen in Fig. 2 that the translucent front 19 completely covers the mirror 10 and that any rays of light coming in through the back window of the automobile must first shine through the front 19 and again be reflected by the mirror 10 through the front 19 before it strikes the driver's eyes.

By curving the front 19 there is a diffusion of any rays which might be reflected by the front 19 so that all glaring is eliminated. When the device is not to be used, it is simply turned at the position shown in Figs. 3 and 4 where it is held by the action of the spring 20.

It is a well known fact that various types of shields have been made in the past. I therefore do not claim such devices broadly, but I do intend to cover all such forms and modifications thereof as fall fairly within the appended claims.

I claim:

1. A device of the class described consisting of a translucent cover for the front of a rear view mirror, a back hinged along one side of said cover and adapted to extend behind said mirror, suction cups attached to said back and adapted to engage the rear side of said rear view mirror and means for urging said back to a position in front of said mirror or away from same.

2. In a device of the class described the combination of a translucent cover for the front side of a rear view mirror, a back for the rear side of the mirror hinged along one edge to said cover, suction cups for attaching said back to said mirror and spring urged means for attaching said front to said back.

3. A device of the class described consisting of a pair of vacuum cups adapted to be placed against the back of a rear view mirror on each side of its central support, a back attached to said cups and extending upwardly above said mirror, a front hinged to the upper edge of said back and spring urged means for urging said front in front of said mirror or away from the front of said mirror.

CARL D. KELLY.